Dec. 30, 1958     A. C. SCINTA     2,866,219
WINDSHIELD WIPER
Filed June 10, 1953
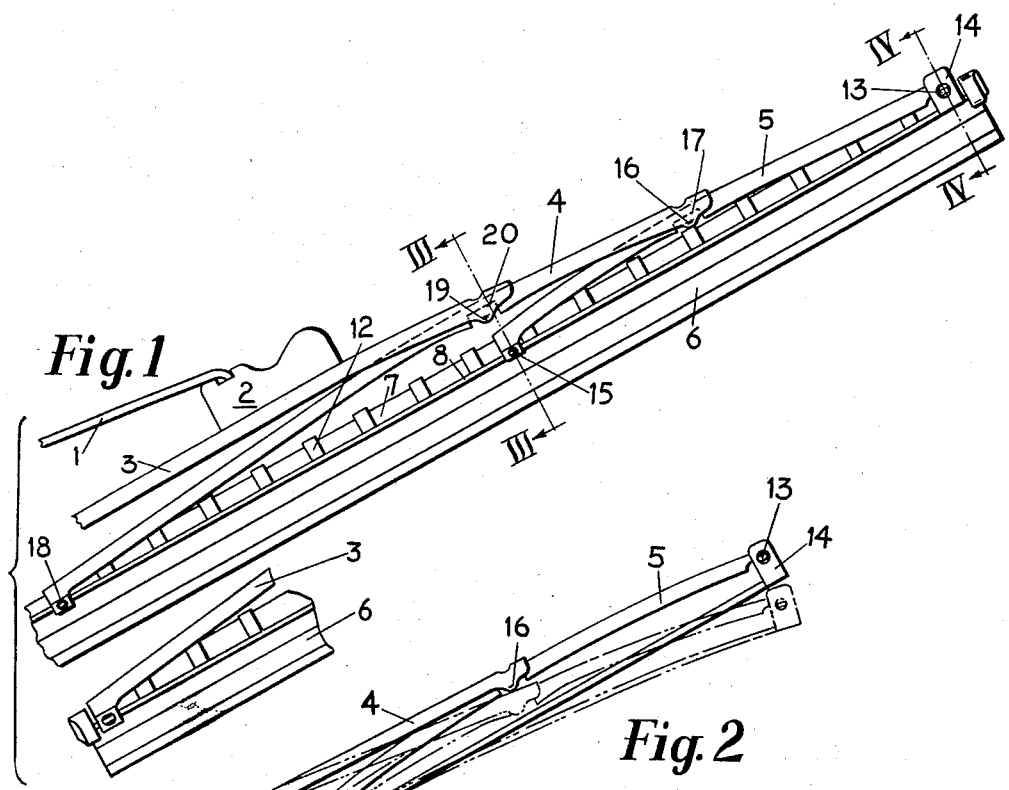
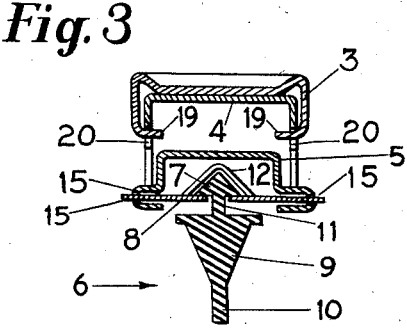
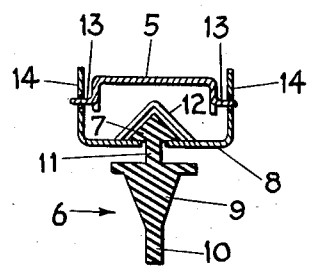
INVENTOR.
*Anthony C. Scinta*
BY
*Bean, Brooks, Buckley & Bean*
ATTORNEYS United States Patent Office 2,866,219
Patented Dec. 30, 1958

2,866,219

WINDSHIELD WIPER

Anthony C. Scinta, Buffalo, N. Y., assignor to Trico Products Corporation, Buffalo, N. Y.

Application June 10, 1953, Serial No. 360,788

12 Claims. (Cl. 15—245)

This invention relates to a windshield wiper, and more particularly to a wiper adapted to clean curved windshield surfaces.

Primarily, it is the object of this invention to provide a windshield wiper wherein due to the distribution of pressure transverse to its longitudinal axis and its bowing inwardly at a gradually diminishing rate, constant conformity to the surface being cleaned may be attained as it moves thereacross.

For a better understanding of this and other objects of the invention, reference is made to the following specifications and accompanying drawings, wherein:

Fig. 1 is a fragmentary view of a windshield wiper constructed in accordance with the instant invention;

Fig. 2 is a diagrammatic view of a portion of the superstructure of the wiper illustrated in Fig. 1;

Fig. 3 is a sectional view of the wiper taken along line III—III of Fig. 1; and, Fig. 4 is a sectional view of the wiper taken along line IV—IV of Fig. 1.

Referring now more particularly to the drawings, the numeral 1 designates the wiper actuating arm attached to clip 2 mounted on primary lever 3, the opposite end of the arm, not shown, being connected to the rockshaft of the wiper motor, as is customary. The arm 1 is spring pressed toward the windshield in a conventional manner. The pressure resulting from the arm being urged toward the windshield is transmitted from it to the primary lever, from there to the secondary lever 4 and thence to the yoke 5.

The squeegee 6 comprises a triangular marginal bead 7 seated in a channel provided therefor in backing member 8. The marginal bead is connected to the body 9 of the squeegee which tapers to a rectangular lip 10, by a neck 11. The backing strip comprises two flanges connected by arched cross-arms or vertebra 12 spaced along its longitudinal axis. The vertebra define the top boundary of the channel for the marginal bead and also provide the flexibility requisite to the backing strip for surface conformation as the wiper moves across the constantly changing curvature of the windshield. It should be noted that a limited amount of freedom of movement is permitted between the channel and the marginal bead in order that the squeegee may more readily make uniform contact with the windshield.

Horizontal lugs 13 on yoke 5 are pivotally connected to upstanding arms in the form of upturned ears 14 of the backing strip, so as to permit freedom of relative angular motion, but prevent relative rectilinear motion. The opposite end of the yoke is pivotally connected to the backing strip at 15, as by lugs 15'. Inturned lugs 16 on secondary lever 4 and undercut portions 17 on the yoke provide sliding engagement therebetween, while the opposite end of the secondary lever is pivotally connected to the backing strip at 18. Sliding engagement is also provided between the primary and secondary levers via inturned lugs 19 and undercut portions 20. The opposite end of the primary lever is pivotally connected to the terminal portion of the backing strip in a manner similar to connections 15 and 18.

From the above description it may be seen that as the arm exerts pressure upon the primary lever, the latter will tend to flatten and spread, the spreading being permitted by the sliding connection between the primary and secondary levers. This action results in a transmission of the pressure to the lower end of the backing member, causing a firm contact between the squeegee and windshield in that area, and to the secondary lever, resulting in a flattening and spreading of that member. The pressure applied to the secondary lever is transmitted to the backing strip and therefore to the squeegee at 18, and to the yoke at connection 16—17. However, as both ends of the yoke are attached to the backing strip and no spreading permitted therebetween, the yoke will tend to rotate about connection 15 toward the windshield, as is illustrated in Fig. 2. It may be noted that the connection between the yoke and the backing strip is fundamentally triangular, the three sides being the yoke, the upturned ears 14 and the backing strip proper. As a result of this linkage, any rotation of the yoke about connection 15 will cause a diminishment of the angle between it and the upturned ears since pivotal movement is permitted therebetween. This results in a foreshortening of that side of the triangle defined by the backing strip, causing the latter to flex or bow inwardly in smooth and uniform conformance to the surface of the windshield. Further, the bowing will be transmitted within the backing member beyond connection 15, causing flexure of a gradually diminishing magnitude throughout its entire length. As the squeegee is carried by the backing member with only slight freedom of movement being permitted therebetween, the flexing of the strip will cause a similar flexing of the squeegee, with the backing strip constituting the neutral plane of flexure of the squeegee.

It can therefore be seen, that by applying pressure to the backing strip at intermittent points throughout its length and by causing the entire strip and the squeegee to bow inwardly in conformance with the curvature of the windshield, a degree of uniformity of contact between the squeegee and the windshield, not heretofore achievable may be attained.

Having thus disclosed an exemplary embodiment thereof, what I claim as my invention is:

1. A wiper for curved surfaces comprising, a flexible wiping element, resiliently flexible non-extensible backing means for said element, at least a portion of said backing means constituting a neutral plane of flexure for said wiping element, a wiper actuating arm, a pressure-distributing yoke interposed between said wiper actuating arm and said backing means, and relatively fixed pivotal connections between said backing means and said yoke with one of said connections being made outside of said neutral plane of flexure and the other of said connections being substantially within said plane to enable flexing of said backing means relative to said yoke while substantially precluding relative rectilinear motion therebetween.

2. A wiper for curved surfaces, comprising a wiping element, resilient backing means, at least a portion of said backing means constituting a neutral plane of flexure of said wiping element, a pressure transmitting yoke, pivotal fixed connections between the ends of said yoke and the backing means, one of said connections being outside of the neutral plane of flexure, a first lever having one end fixedly pivotally connected to the backing means and its opposite end slidably connected to an intermediate portion of the first yoke, and a second lever having one end slidably connected to an intermediate portion of the first lever and its opposite end fixedly pivotally connected to the backing means.

3. A wiper for curved surfaces comprising, a wiping element, resilient backing means for said wiping element, upstanding arm means rigid with said backing means, a wiper actuating arm, and pressure-distributing means including a yoke interposed between said backing means and said wiper actuating arm, one end of said yoke being pivotally connected directly to said backing means and the opposite end thereof being pivotally connected to the upper end of said upstanding arm means in a manner substantially precluding relative longitudinal movement between said yoke and said backing means.

4. A wiper for curved surfaces comprising, a wiping element, resilient backing means for said wiping element, upstanding arm means rigid with said backing means, a yoke pivotally connected to the arm means at one end and having its opposite end pivotally connected directly to the backing means, and a lever having one end slidably connected to an intermediate portion of the yoke and its opposite end connected to the backing means, said backing means being flexible toward and from said yoke and lever and rocking the arms means therewith.

5. A wiper for curved surfaces comprising, a flexible wiping element, resilient backing means for said wiping element, upstanding arm means rigid with said backing means, and a pressure transmitting yoke having one end pivotally connected to the upper end of the arm means and its opposite end pivotally connected to the backing means at a point longitudinally spaced from the arm means, the intermediate portion of the backing means being flexible toward and from the yoke and rocking the arm means therewith.

6. A wiper for curved surfaces comprising, a wiping element, resilient backing means for said wiping element, upstanding arm means rigid with said backing means, a yoke pivotally connected to the arm means at one end and having its opposite end pivotally connected to the backing means, the pivotal connections of said yoke to said backing means and to said arm means substantially precluding relative longitudinal movement between said yoke and said backing means, and a lever having one end connected to an intermediate portion of the yoke and its opposite end connected to the backing means, said backing means being flexible toward and from said yoke and lever and rocking the arm means therewith.

7. A wiper for curved surfaces comprising, a wiping element, resilient backing means, at least a portion of said backing means constituting a neutral plane of flexure for said wiping element, a wiper actuating arm, a yoke interposed between said wiper actuating arm and said backing means, and pivotal connections between said yoke and said backing means, said connections being of a type substantially precluding relative longitudinal spreading movement between said yoke and said backing means and one of said connections being made outside of the neutral plane of flexure to enable surface-conforming flexing of the wiping element and said backing means relative to said yoke.

8. A wiper for curved surfaces comprising, a wiping element, resilient backing means for said wiping element, upstanding arm means rigid with said backing means, a yoke fixedly pivotally connected to the arm means at one end and having its opposite end fixedly pivotally connected to the backing means, and a lever having one end slidably connected to an intermediate portion of the yoke and its opposite end fixedly pivotally connected to the backing means, said backing means being flexible toward and from said yoke and lever and rocking the arm means therewith.

9. A wiper for curved surfaces comprising, a wiping element, resilient backing means for said wiping element, a wiper actuating arm, a yoke having a first end and a second end interposed between said backing means and said wiper arm, the first end of said yoke being pivotally connected directly to the backing means, and upstanding arm means interposed between the second end of said yoke and the backing means and movable with the latter, said second end of said yoke being pivotally connected to said upstanding arm means.

10. A wiper for curved surfaces comprising, a wiping element, resilient backing means, at least a portion of said backing means constituting a neutral plane of flexure for said wiping element, a wiper carrying arm, and pressure transmitting means between said arm and said element including a yoke, pivotal fixed connections between the ends of said yoke and said backing strip with one of said connections being outside of said neutral plane of flexure, and a lever having one end connected to an intermediate portion of said yoke and its opposite end connected to said backing strip.

11. A wiper for curved surfaces comprising, a wiping element, resilient backing means for said wiping element, upstanding arm means rigid with said backing means adjacent one end thereof, a yoke fixedly pivotally connected to the arm means at one end and having its opposite end fixedly pivotally connected directly to the backing means, a first lever fixedly pivotally connected to said backing means at one end and slidably connected to an intermediate portion of said yoke at its opposite end, and a second lever slidably connected to an intermediate portion of the first lever at one end and fixedly pivotally connected to the backing means at its opposite end, said backing means being flexible toward and from said yoke and levers and rocking the arm means therewith.

12. A wiper for curved surfaces comprising, a wiping element, resilient backing means, at least a portion of said backing means constituting a neutral plane of flexure for said wiping element, a pressure transmitting yoke, fixed pivotal connections between the ends of said yoke and the backing means, one of said connections being outside of the neutral plane of flexure and the other of said connections being substantially in said plane, a first lever having one end pivotally connected to the backing means and its opposite end connected to an intermediate portion of the first yoke, and a second lever connected at its opposite ends to an intermediate portion of the first lever and the backing means respectively.

References Cited in the file of this patent

UNITED STATES PATENTS

| | | |
|---|---|---|
| 2,596,063 | Anderson | May 6, 1952 |
| 2,664,583 | Oishei | Jan. 5, 1954 |
| 2,702,397 | Oishei | Feb. 22, 1955 |